United States Patent [19]

Bird

[11] Patent Number: 6,052,888
[45] Date of Patent: *Apr. 25, 2000

[54] METHOD OF STIFFENING A FLEXIBLE PIPE

[75] Inventor: Edwin A. Bird, Ashdown, Ark.

[73] Assignee: M & FC Holding Company, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/624,915

[22] Filed: Mar. 27, 1996

Related U.S. Application Data

[63] Continuation-in-part of application No. 08/373,974, Jan. 18, 1995, abandoned.

[51] Int. Cl.[7] .................................................... B23P 11/00
[52] U.S. Cl. .............................................. 29/523; 138/137
[58] Field of Search .............................. 29/521, 523, 423; 285/55, 382.4, 382.5, 397; 138/137, 140

[56] References Cited

U.S. PATENT DOCUMENTS

| | | | |
|---|---|---|---|
| 1,102,163 | 6/1914 | Opperud | 285/397 |
| 1,181,856 | 5/1916 | Downer | 285/137 X |
| 2,850,304 | 9/1958 | Wagner | 285/397 |
| 2,901,024 | 8/1959 | Marsden | 138/137 X |
| 3,343,248 | 9/1967 | Silverman . | |
| 3,538,792 | 11/1970 | Stillwagon, Jr. | 29/523 X |
| 3,575,447 | 4/1971 | Merkle | 285/248 |
| 3,762,173 | 10/1973 | Marsh . | |
| 4,006,923 | 2/1977 | Wagner | 285/39 |
| 4,132,437 | 1/1979 | Green . | |
| 4,192,534 | 3/1980 | Bernatt et al. . | |
| 4,295,668 | 10/1981 | Louthan et al. . | |
| 4,333,672 | 6/1982 | Arthur et al. . | |
| 4,660,865 | 4/1987 | Workman . | |
| 4,850,620 | 7/1989 | Puls | 285/174 |
| 4,893,848 | 1/1990 | Melcher | 285/258 |
| 5,127,157 | 7/1992 | Oetiker | 29/523 X |
| 5,207,460 | 5/1993 | Oetiker | 285/258 |
| 5,295,718 | 3/1994 | Bartholomew | 285/258 |
| 5,326,137 | 7/1994 | Lorenz et al. | 285/55 |
| 5,430,929 | 7/1995 | Sanders | 29/523 X |
| 5,590,914 | 1/1997 | Platner et al. | 285/23 |
| 5,655,796 | 8/1997 | Bartholomew | 29/523 X |

FOREIGN PATENT DOCUMENTS

| | | | |
|---|---|---|---|
| 2083154 | 3/1982 | United Kingdom | 285/397 |

*Primary Examiner*—David P. Bryant
*Attorney, Agent, or Firm*—Terrence (Terry) Martin; Sean D. Detweiler; Jules Jay Morris

[57] ABSTRACT

A method of stiffening a flexible pipe using inserts or stiffeners. To account for non-uniformities and toe in of the flexible pipe, the method involves inserting a pipe stiffener into an end of the pipe and expanding the pipe stiffener within the end to a desired diameter. The stiffener is expanded using an expander, and may be sized to any desired diameter. The pipe stiffener may be expanded within the pipe until its outside diameter approximates the inside diameter of the pipe. Alternatively, the pipe stiffener may be expanded within the pipe by an expander until its inside diameter approximates the inside diameter of the pipe before the pipe stiffener is expanded within the pipe. Finally, the stiffener may be expanded within the pipe until the outside diameter of the pipe approximates the outside diameter of other pipes to be joined thereto.

25 Claims, 2 Drawing Sheets

METHOD OF STIFFENING A FLEXIBLE PIPE

CROSS REFERENCE TO RELATED APPLICATION

This is a continuation-in-part of U.S. patent application Ser. No. 08/373,974, filed Jan. 18, 1995, now abandoned, which is incorporated herein by reference.

FIELD OF THE INVENTION

The present invention relates to a method of stiffening a flexible pipe, and, particularly, to a method of stiffening an end of a flexible pipe to eliminate the adverse effects of pipe "toe-in" and other non-uniformities in the pipe surface.

BACKGROUND OF THE INVENTION

For many years, conventional piping systems consisted solely of rigid, metallic pipes. Recently, however, plastic pipes have become popular because they are light, flexible, corrosion resistant, and can be installed with relative ease compared to metallic pipes. Despite these advantages, however, where rigidity is required plastic pipes have proven to be unacceptable substitutes for metallic pipes due to their flexibility.

For example, plastic pipes have not proven to be amenable to joining with conventional pipe couplings. When using push-on or mechanical-type couplings, the force necessary to form a gas or liquid-tight seal tends to deform the ends of the flexible pipe. In addition, pipes formed from flexible materials tend to cold-flow, relieving the sealing forces exerted from initial insertion and compromising the integrity of the joint. Also, when flexible plastic pipe is used in buried systems or the like, the end of the pipe is subjected to excessive pressure from the surrounding soil. This pressure can cause the end of the pipe to deform slightly, thereby causing a flow restriction within the pipe or a loss of sealing forces at a coupling.

To address these problems, attempts have been made to place inserts or stiffeners inside the flexible pipe at the end of the pipe segment, e.g. near the location of an intended joint. These stiffeners are made from a rigid material specifically sized to the minimum pipe inside diameter, and are typically press or wedge fit into the end of the pipe to provide an area of rigid support. This method makes the pipe stiff enough for couplings to work well, but has its limitations.

One problem which is inherent with the use of press or wedge fit pipe stiffeners is that their existence within the pipe causes a flow restriction. In areas where pressure drop and flow rates are critical, the presence of a stiffener into a pipe is, therefore, undesirable. Also, most plastic pipe is extruded without precise inside dimension controls. Accordingly, the inside diameter of most standard pipes varies widely and flat spots tend to appear on the interior surface of the pipe along with abrupt changes in surface profile. In small diameter pipe, inside deviations are usually small enough that press or wedge fit stiffeners may work. However, on large diameter pipe the inside diameter variation makes it almost impossible to build a stiffener that fits snug enough to work without being difficult to slip inside the pipe.

Another problem inherent with polyolefin pipe materials is that upon cutting the end of the pipe shrinks by as much as 2% of the diameter. This shrinking is called "toe in". For example, when a 24 inch pipe is cut, the cut end can shrink as much as 0.5 inches in inside and outside diameter. When this happens it is impossible to press or wedge fit a stiffener inside the pipe that has been sized to the original pipe inside diameter.

Thus, there is a need in the art for a method of stiffening flexible pipes which accounts for the various non-uniformities at the ends of a flexible pipe.

OBJECTS OF THE INVENTION

Accordingly, it is an object of the present invention to provide a method of efficiently stiffening flexible pipes of varying diameters using pipe stiffeners or inserts.

Another object of the present invention is to provide a method of stiffening a flexible pipe using a pipe stiffener where the flexible pipe exhibits shrinking or "toe in" at its end.

Yet another object of the present invention is to provide a method of stiffening a flexible pipe using a pipe stiffener while avoiding flow restriction through the pipe.

Still another object of the present invention is to provide a method of stiffening a flexible pipe using a pipe stiffener wherein the stiffener may be expanded within the pipe to increase the diameter of the pipe.

These and other objects of the present invention will become apparent from a review of the description provided below.

SUMMARY OF THE INVENTION

The present invention relates to a method of stiffening a flexible pipe using a pipe stiffener. The method involves inserting a pipe stiffener into an end of the flexible pipe and expanding the pipe stiffener within the pipe to a desired diameter. Preferably, the stiffener is inserted into the pipe at least until it is approximately flush with the pipe end, and the stiffener has an outside diameter which is about 2.5% or more smaller than the inside diameter of the pipe before it is expanded within the pipe end.

The stiffener is expanded using a known expander, and may be sized to any desired diameter within the pipe. For example, the pipe stiffener may be expanded within the flexible pipe until its outside diameter approximates the inside diameter of the pipe. This reduces the need for exact sizing of the stiffener prior to inserting it into the pipe.

The pipe stiffener may also be expanded within the pipe until the inside diameter of the pipe stiffener approximates the inside diameter of the pipe before the pipe stiffener is expanded therein. This eliminates the problem of a flow restriction through the flexible pipe being caused by the stiffener. In addition, the stiffener may be expanded within the pipe until the outside diameter of the pipe approximates the outside diameter of other pipes to be joined to the flexible pipe. This eliminates the problems associated with the non-uniformity in joining pipes of standard pipe sizes.

BRIEF DESCRIPTION OF THE DRAWING

A preferred embodiment of the invention is described below with reference to the following figures wherein like numerals represent like parts.

DETAILED DESCRIPTION OF THE INVENTION

Figure 1:
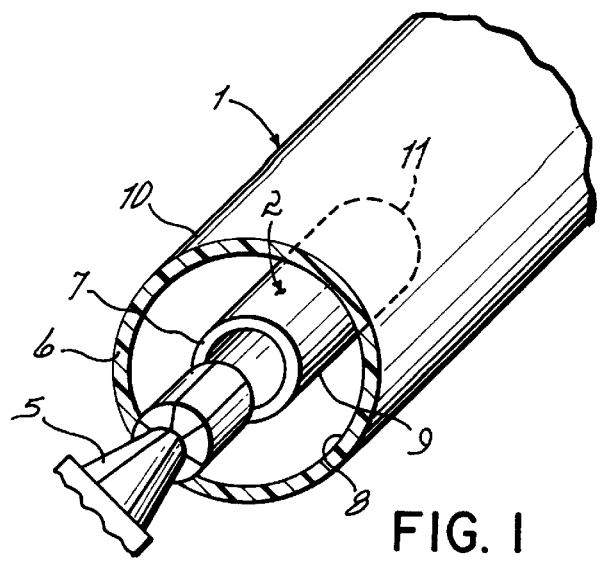
FIG. 1: is an end view of a pipe containing a stiffener according to the present invention prior to the expansion of the stiffener within the pipe.

FIG. 1 is an end view of a flexible pipe 1 containing a stiffener 2 to be expanded therein using expander 5 according to the present invention. The flexible pipe 1 is a standard industry plastic pipe typically constructed of polyethylene (PE), polybutylene (PB), polyvinlychloride (PVC), polyolefin, or fiberglass. The stiffener 2 has a first end 7 and a second end 11, and is typically formed from a flat plate of stainless steel, carbon steel, copper or brass, although other rigid materials will suffice. The flat plate is formed into a stiffener by rolling the plate to a desired diameter and welding the ends of the plate together. In the alternative, the stiffener may be cut from a piece of tubing or pipe having an appropriate outside diameter.

Figure 2:
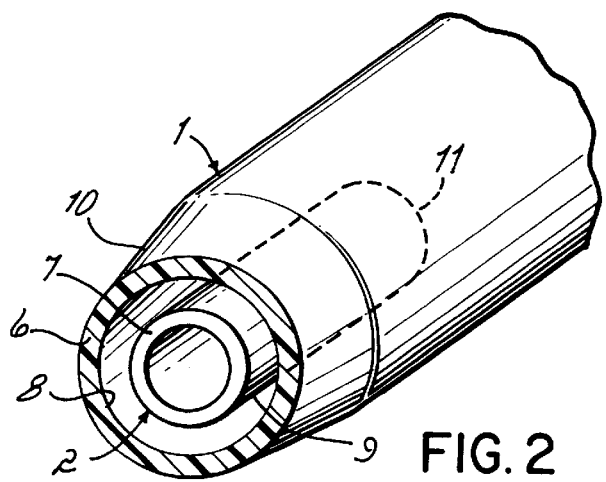
FIG. 2: is an end view of a pipe exhibiting toe-in and containing a stiffener according to the present invention prior to the expansion of the stiffener within the pipe.

Referring to FIG. 2, there is shown a flexible pipe 1 exhibiting "toe-in". As discussed above, the cut end 10 can shrink as much as 0.5 inches in inside and outside diameter. When this happens it is impossible to press or wedge fit a stiffener inside the pipe that has been sized to the original pipe inside diameter. In order to compensate for the occurrence of pipe "toe in" or fluctuations in the uniformity of the pipe surfaces, the stiffener 2 is formed with an outside diameter which is smaller than the inside diameter of the pipe 1. Typically, the outside diameter of the stiffener is made to be at least 2.5% smaller than the published minimum inside diameter for the pipe. For example, a standard 24" PE pipe with a dimension ratio of 32.5 (the outside diameter of the pipe divided by the wall thickness) has a published minimum inside diameter of 22.435". The stiffener to be used in this pipe is, therefore, preferably formed to have an outside diameter of about 21.875"=22.435–(22.435) (0.025).

After the stiffener is formed for the particular application, it is inserted into the end of the flexible pipe 1. Preferably, the stiffener 2 is inserted into the pipe 1 at least until its end 7 is approximately flush with the end 6 of the flexible pipe. Once inserted into the pipe 1, the stiffener 2 is expanded therein using a known expander 5, although several other means of expanding the stiffener could be employed by those skilled in the art. As is known, the expander 5 uses a wedged shaped ram that is tapered matching tapered dies that are forced outward as the ram is hydraulically moved. The expander, therefore provides uniform and controllable expansion of the stiffener within the pipe. Since the stiffeners are formed in relation to pipe minimum inside diameters, the stiffener is generally expanded by 10% or less. Nonetheless, depending on the type of material used in constructing the stiffener, e.g. stainless steel, it is possible to expand the stiffener up to 40% within the pipe.

Figure 3:
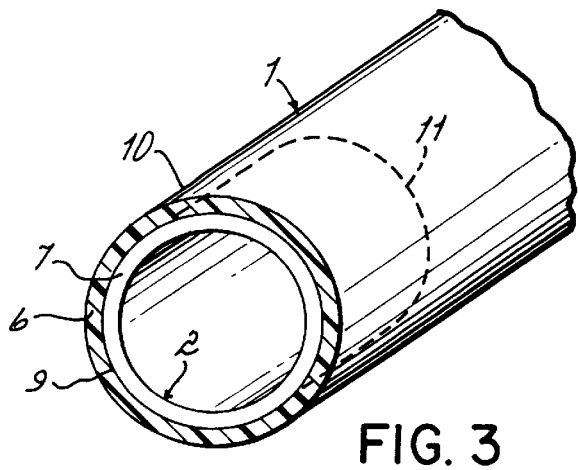
FIG. 3: is an end view of one embodiment of the present invention wherein the stiffener of FIG. 1 has been expanded so that its outside diameter approximates the inside diameter of the pipe.

Referring to FIG. 3, the stiffener 2 may be positioned within the pipe 1 and expanded to any desired diameter to eliminate non-uniformities within the pipe, or to prevent collapse of the pipe 1 due to extreme pressure. For example, in a buried system or the like, the pipe 1 may be inserted into the ground in contact with soil, sand, or rocks. With flexible pipe, the pressure of the soil against the pipe 1 can cause the pipe to collapse thereby causing a flow restriction. Stiffening the end of the flexible pipe 1 with the rigid stiffener 2, eliminates the effects of pressure in such systems by providing an area of rigid support for the pipe where the outer surface 9 of rigid stiffener 2 contacts the inner surface 8 of the pipe.

Figure 4:
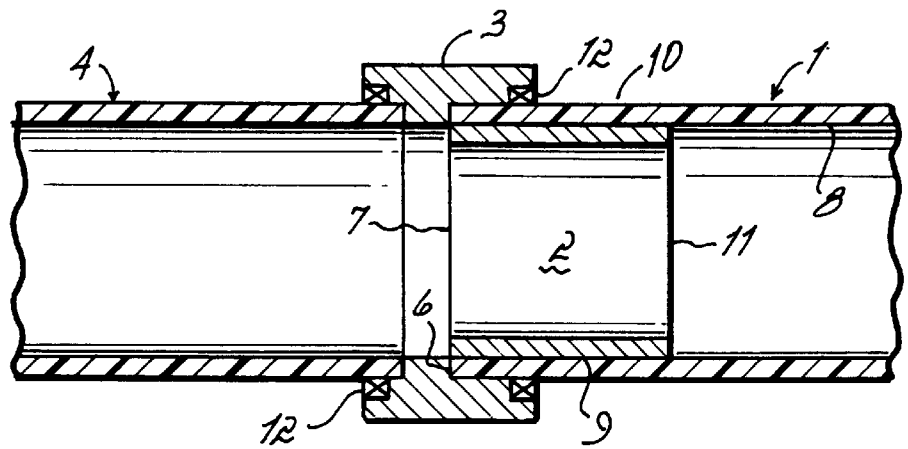
FIG. 4: is a side sectional view of a joint between a pipe having a stiffener expanded therein according to the invention and another pipe.
Figure 5:
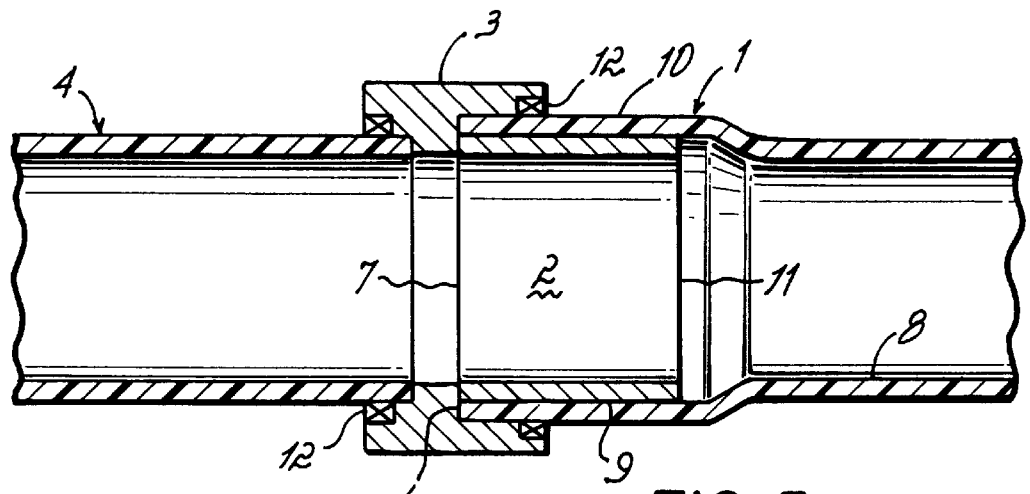
FIG. 5: is a side sectional view of a joint between a pipe having a stiffener expanded therein and another pipe, wherein the stiffener has been expanded to have an inside diameter which approximates the initial inside diameter of the pipe.
Figure 6:
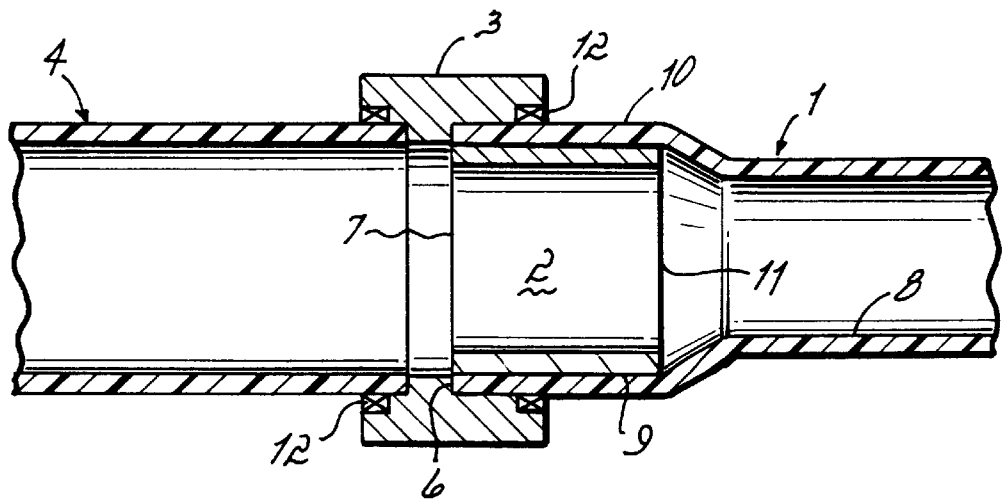
FIG. 6: is a side sectional view of a joint between a pipe having a stiffener expanded therein and another pipe, wherein the stiffener has been expanded so that the outside diameters of the joined pipes match.

Referring now to FIGS. 4–6, when stiffening a flexible pipe in preparation for a joint with another pipe, the length of the stiffener is chosen depending on the size of coupling to be used. Preferably, the stiffeners are formed as 75% of the coupling length. For example, when joining two standard 24" PE pipes with a dimension ratio of 32.5 a 12" long coupling is typically used. p In this case the stiffener would preferably be formed to have a length of 9".

The stiffener 2 must be positioned inside the pipe 1 such that it supports the pipe in the area where the seals 12 of the coupling 3 are to engage the pipe outside walls to form a sealing surface. When using stiffeners to support a pipe that is to be fused together it may be necessary to inset the stiffener 2 as much as an inch from the end of the pipe. When using the stiffener as a means to connect a flange it may be extended axially from the pipe to allow for welding or grooved couplings. However, when standard couplings are used the stiffeners may be placed flush with the end of the pipe.

Turning now to FIG. 4, one embodiment of the present invention is shown wherein the method according to the invention is used to stiffen a flexible pipe 1 at an end thereof to facilitate joining with other pipe 4 using the coupling 3. As can be seen, the ends of the pipes 1, 4 are generally spaced apart and bridged by the coupling 3 to form the joint. It is understood by those skilled in the art, however, that the ends of the pipes 1,4 may be abutting or spaced as allowed by the coupling to be used. In FIG. 4, the stiffener 2 has been expanded so that the outside diameter of the stiffener approximates the inside diameter of the pipe 4 to be joined using the coupling 3.

As shown in FIG. 5, it is also possible to expand the stiffener so that the inside diameter of the stiffener 2 is the same as the initial inside diameter of the pipe 1 before the stiffener is expanded therein. This approach has the advantage of eliminating reduction of the inside diameter of the pipe 1 thereby avoiding a flow restriction within the pipe. Another alternative, shown in FIG. 6, is to expand the insert 2 until the pipe 1 outside diameter is larger than its initial outside diameter so that it matches the outside diameter of the other pipe 4 it is to be connected to. This allows for matching of standard pipe sizes having non-uniform outside diameters.

There is thus provided a method of stiffening a flexible pipe which accommodates for fluctuations and non-uniformities in the pipe surface. Since a pipe stiffener is expanded within the flexible pipe, the stiffener may be sized such that it is small enough to fit within the pipe even in the presence of toe-in or other significant fluctuations in pipe diameter or uniformity. The difficulties associated with prior art press or wedge fit stiffening methods are, therefore, eliminated.

The embodiments which have been described herein are but some of the several which utilize this invention and are set forth here by way of illustration but not of limitation. It is obvious that many other embodiments which will be readily apparent to those skilled in the art may be made without departing materially from the spirit and scope of this invention. For example, the present invention may be used in connection with a variety of different pipe materials and stiffener materials. In addition, the stiffener may be made to any outside diameter as long as it is easily inserted into the pipe and then expanded.

What is claimed is:

1. A method of stiffening a flexible pipe comprising:
providing a length of flexible pipe having a continuous sidewall extending between opposite ends and adapted to carry fluid therethrough between the ends;
providing a rigid pipe stiffener dimensioned to fit within said flexible pipe adjacent one of the ends thereof;
inserting said pipe stiffener into said flexible pipe at least until an end of said stiffener is approximately flush with said one end of said flexible pipe; and
expanding said pipe stiffener within said flexible pipe to force an outside surface of said pipe stiffener against an inside surface of said flexible pipe until an outside diameter of said pipe stiffener approximates an inside diameter of said flexible pipe, thereby providing an area of rigid support for said flexible pipe where said outside surface of said pipe stiffener contacts said inside surface of said flexible pipe.

2. A method according to claim 1, wherein said pipe stiffener has an outside diameter which is at least 2.5% smaller than an inside diameter of said flexible pipe before said pipe stiffener is expanded within said flexible pipe.

3. A method according to claim 1, wherein said flexible pipe is a plastic pipe.

4. A method according to claim 1, wherein said flexible pipe is formed from polyethylene.

5. A method according to claim 1, wherein said flexible pipe is formed from polybutylene.

6. A method according to claim 1, wherein said flexible pipe is formed from polyvinlychloride.

7. A method according to claim 1, wherein said flexible pipe is a polyolefin pipe.

8. A method according to claim 1, wherein said flexible pipe is formed from fiberglass.

9. A method according to claim 1, wherein said flexible pipe has a length dimension, the method further comprising stiffening a selected partial length thereof less than the length dimension of said pipe.

10. A method of stiffening a plastic pipe, said method comprising:
providing a length of plastic pipe having a continuous sidewall extending between opposite ends and adapted to carry fluid therethrough between the ends, the pipe having a nominal inside diameter along its length and a toe-in, reduced inside diameter at one of the ends;
providing a rigid pipe stiffener having an outside diameter which is smaller than the toe-in, reduced inside diameter of said end of said plastic pipe;
inserting said pipe stiffener into said flexible pipe at least until an end of said stiffener is approximately flush with said one end of said flexible pipe; and
expanding said pipe stiffener within said plastic pipe to force an outside surface of said pipe stiffener against an inside surface of said plastic pipe until an outside diameter of said pipe stiffener approximates an inside diameter of said flexible pipe, thereby providing an area of rigid support for said plastic pipe where said outside surface of said pipe stiffener contacts said inside surface of said plastic pipe.

11. A method according to claim 10, wherein said plastic pipe is a polyolefin pipe.

12. A method according to claim 10, wherein said plastic pipe has a length dimension, the method further comprising stiffening a selected partial length thereof less than the length dimension of said pipe.

13. A method of stiffening a flexible pipe comprising:
providing a length of flexible pipe having an initial inside diameter and a continuous sidewall extending between opposite ends and adapted to carry fluid therethrough between the ends;
providing a rigid pipe stiffener dimensioned to fit within said flexible pipe adjacent one of the ends thereof;
inserting said pipe stiffener into said flexible pipe at least until an end of said stiffener is approximately flush with said one end of said flexible pipe; and
expanding said pipe stiffener within said flexible pipe to force an outside surface of said pipe stiffener against an inside surface of said flexible pipe until said pipe stiffener has an inside diameter which approximates said initial inside diameter of said flexible pipe, thereby providing an area of rigid support for said flexible pipe where said outside surface of said pipe stiffener contacts said inside surface of said flexible pipe.

14. A method according to claim 13, wherein said pipe stiffener has an outside diameter which is at least 2.5% smaller than an inside diameter of said flexible pipe before said pipe stiffener is expanded within said flexible pipe.

15. A method according to claim 13, wherein said flexible pipe is a plastic pipe.

16. A method according to claim 13, wherein said flexible pipe is formed from polyethylene.

17. A method according to claim 13, wherein said flexible pipe is formed from polybutylene.

18. A method according to claim 13, wherein said flexible pipe is formed by polyvinlychloride.

19. A method according to claim 13, wherein said flexible pipe is a polyolefin pipe.

20. A method according to claim 13, wherein said flexible pipe is formed from fiberglass.

21. A method according to claim 13, wherein said flexible pipe has a length dimension, the method further comprising stiffening a selected partial length thereof less than the length dimension of said pipe.

22. A method of stiffening a plastic pipe, said method comprising:
providing a length of plastic pipe having a continuous sidewall extending between opposite ends and adapted to carry fluid therethrough between the ends, the pipe having a nominal inside diameter along its length and a toe-in, reduced inside diameter at one of the ends;
providing a rigid pipe stiffener having an outside diameter which is smaller than the toe-in, reduced inside diameter of said end of said plastic pipe;
inserting said pipe stiffener into said flexible pipe at least until an end of said stiffener is approximately flush with said one end of said flexible pipe; and
expanding said pipe stiffener within said plastic pipe to force an outside surface of said pipe stiffener against an inside surface of said plastic pipe until the reduced inside diameter of said end of said plastic pipe is increased to substantially equal the nominal inside diameter of said plastic pipe, thereby providing an area of rigid support for said plastic pipe where said outside surface of said pipe stiffener contacts said inside surface of said plastic pipe.

23. A method according to claim 22 further comprising continuing to expand the pipe stiffener after the reduced inside diameter of said end of plastic pipe is expanded to substantially equal the nominal inside diameter of the plastic pipe.

24. A method according to claim 22, wherein said plastic pipe has a length dimension, the method further comprising stiffening a selected partial length thereof less than the length dimension of said pipe.

25. A method of stiffening a flexible pipe comprising:

providing a length of flexible pipe having an initial inside diameter and a continuous sidewall extending between opposite ends and adapted to carry fluid therethrough between the ends;

providing a rigid pipe stiffener having a generally constant inside diameter and dimensioned to fit within said flexible pipe adjacent one of the ends thereof;

inserting said pipe stiffener into said flexible pipe at least until an end of said stiffener is approximately flush with said one end of said flexible pipe; and expanding said pipe stiffener within said flexible pipe to force an outside surface of said pipe stiffener against an inside surface of said flexible pipe until said pipe stiffener has a generally constant inside diameter which exceeds said initial inside diameter of said flexible pipe, thereby providing an area of rigid support for said flexible pipe where said outside surface of said pipe stiffener contacts said inside surface of said flexible pipe.

\* \* \* \* \*